(12) United States Patent
Choo et al.

(10) Patent No.: US 7,294,999 B2
(45) Date of Patent: Nov. 13, 2007

(54) APPARATUS FOR AUTOMATICALLY DISPLAYING THE GRADE OF LIQUID CRYSTAL DISPLAY DEVICE AND OPERATING METHOD THEREOF

(75) Inventors: Hun-Jun Choo, Gyungsangbuk-Do (KR); Ji-Heum Uh, Seoul (KR); Hye-Sook Kang, Gyungsangbuk-Do (KR); Cheol-Han Kim, Seoul (KR); Seong-Chul Yeo, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/023,551

(22) Filed: Dec. 29, 2004

(65) Prior Publication Data

US 2005/0162183 A1 Jul. 28, 2005

(30) Foreign Application Priority Data

Dec. 30, 2003 (KR) ..................... 10-2003-0100850

(51) Int. Cl.
 *G01R 31/28* (2006.01)
(52) U.S. Cl. ..................... 324/158.1; 209/573; 324/770
(58) Field of Classification Search .............. 324/760, 324/765, 770, 414, 158.1; 209/571, 573; 349/17, 25

See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,694,964 A * | 9/1987 | Ueberreiter | 209/549 |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,321,536 A * | 6/1994 | Ishii et al. | 349/17 |
| 5,379,139 A | 1/1995 | Sato et al. | |
| 5,406,989 A | 4/1995 | Abe | |
| 5,432,451 A * | 7/1995 | McGill et al. | 324/322 |
| 5,499,128 A | 3/1996 | Hasegawa et al. | |
| 5,507,323 A | 4/1996 | Abe | |

(Continued)

FOREIGN PATENT DOCUMENTS

EP 1003066 A1 5/2000

(Continued)

*Primary Examiner*—Ernest Karlsen
*Assistant Examiner*—Arleen M. Vazquez
(74) *Attorney, Agent, or Firm*—McKenna Long & Aldridge LLP

(57) ABSTRACT

An apparatus for automatically displaying a grade of a liquid crystal display device and operating method thereof, includes a grade determining unit of a liquid crystal display panel; a grade inputting unit for inputting the grade of the liquid crystal display panel whose grade has been determined in the grade determining unit; a grade discriminating unit for transferring the grade of a corresponding liquid crystal display panel based upon receiving data input to the grade inputting unit; a storing unit having a grade displaying unit for classifying the graded liquid crystal display panels according to grades and storing the grades; and a robot driving unit for transferring the liquid crystal display panel to the storing unit according to instructions from the grade discriminating unit.

7 Claims, 2 Drawing Sheets

U.S. PATENT DOCUMENTS

| | | | |
|---|---|---|---|
| 5,511,591 A | 4/1996 | Abe | |
| 5,539,545 A | 7/1996 | Shimizu et al. | |
| 5,548,429 A | 8/1996 | Tsujita | |
| 5,584,395 A * | 12/1996 | Homma | 209/571 |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,850,087 B2 * | 2/2005 | Ito et al. | 324/770 |
| 6,914,424 B2 * | 7/2005 | Chi et al. | 324/158.1 |
| 2001/0021000 A1 | 9/2001 | Egami | |

FOREIGN PATENT DOCUMENTS

| | | |
|---|---|---|
| JP | 51-65656 | 7/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-313870 | 8/1994 |
| JP | 06265915 | 9/1994 |
| JP | 07-084268 | 3/1995 |
| JP | 07-128674 | 5/1995 |
| JP | 07-181507 | 7/1995 |
| JP | 09-061829 | 8/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 09-311340 | 12/1997 |
| JP | 10-123537 | 5/1998 |
| JP | 10-123538 | 5/1998 |
| JP | 10-142616 | 5/1998 |
| JP | 63-110425 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |

| | | | | | |
|---|---|---|---|---|---|
| JP | 2001-117109 | 4/2001 | JP | 2002-122870 | 4/2002 |
| JP | 2001-133745 | 5/2001 | JP | 2002-122872 | 4/2002 |
| JP | 2001-133794 | 5/2001 | JP | 2002-122873 | 4/2002 |
| JP | 2001-133799 | 5/2001 | JP | 2002-131762 | 5/2002 |
| JP | 2001-142074 | 5/2001 | JP | 2002-139734 | 5/2002 |
| JP | 2001-147437 | 5/2001 | JP | 2002-156518 | 5/2002 |
| JP | 2001-154211 | 6/2001 | JP | 2002-169166 | 6/2002 |
| JP | 2001-166272 | 6/2001 | JP | 2002-169167 | 6/2002 |
| JP | 2001-166310 | 6/2001 | JP | 2002-182222 | 6/2002 |
| JP | 2001-183683 | 7/2001 | JP | 2002-202512 | 7/2002 |
| JP | 2001-201750 | 7/2001 | JP | 2002-202514 | 7/2002 |
| JP | 2001-209052 | 8/2001 | JP | 2002-214626 | 7/2002 |
| JP | 2001-209056 | 8/2001 | JP | 2002-229042 | 8/2002 |
| JP | 2001-209057 | 8/2001 | JP | 2002-236276 | 8/2002 |
| JP | 2001-209058 | 8/2001 | JP | 2002-258299 | 8/2002 |
| JP | 2001-209060 | 8/2001 | JP | 2002-236292 | 9/2002 |
| JP | 2001-215459 | 8/2001 | JP | 2002-277865 | 9/2002 |
| JP | 2001-222017 | 8/2001 | JP | 2002-277866 | 9/2002 |
| JP | 2001-235758 | 8/2001 | JP | 2002-277881 | 9/2002 |
| JP | 2001-255542 | 9/2001 | JP | 2002-287156 | 10/2002 |
| JP | 2001-264782 | 9/2001 | JP | 2002-296605 | 10/2002 |
| JP | 2001-272640 | 10/2001 | JP | 2002-311438 | 10/2002 |
| JP | 2001-281675 | 10/2001 | JP | 2002-311440 | 10/2002 |
| JP | 2001-281678 | 10/2001 | JP | 2002-311442 | 10/2002 |
| JP | 2001-282126 | 10/2001 | JP | 2002-323687 | 11/2002 |
| JP | 2001-305563 | 10/2001 | JP | 2002-323694 | 11/2002 |
| JP | 2001-330837 | 11/2001 | JP | 2002-333628 | 11/2002 |
| JP | 2001-330840 | 11/2001 | JP | 2002-333635 | 11/2002 |
| JP | 2001-356353 | 12/2001 | JP | 2002-333843 | 11/2002 |
| JP | 2001-356354 | 12/2001 | JP | 2002-341329 | 11/2002 |
| JP | 2002-014360 | 1/2002 | JP | 2002-341355 | 11/2002 |
| JP | 2002-023176 | 1/2002 | JP | 2002-341356 | 11/2002 |
| JP | 2002-049045 | 2/2002 | JP | 2002-341357 | 11/2002 |
| JP | 2002-079160 | 3/2002 | JP | 2002-341358 | 11/2002 |
| JP | 2002-080321 | 3/2002 | JP | 2002-341359 | 11/2002 |
| JP | 2002-082340 | 3/2002 | JP | 2002-341362 | 11/2002 |
| JP | 2002-090759 | 3/2002 | KR | 2000-035302 | 6/2000 |
| JP | 2002-090760 | 3/2002 | | | |
| JP | 2002-107740 | 4/2002 | | | |

\* cited by examiner

APPARATUS FOR AUTOMATICALLY DISPLAYING THE GRADE OF LIQUID CRYSTAL DISPLAY DEVICE AND OPERATING METHOD THEREOF

This application claims the benefit of Korean Patent Application No. 2003-100850, filed on Dec. 30, 2003, which is hereby incorporated by reference for all purposes as if fully set forth herein.

BACKGROUND OF THE INVENTION

1. Field of the Invention

The present invention relates to a grade displaying apparatus, and more particularly, to an apparatus for automatically classifying liquid crystal display devices according to grades and displaying each grade to the outside, if each grade is determined after the liquid crystal display devices are completed.

2. Discussion of the Related Art

A liquid crystal display device is thin, light and portable, and thus has been widely used as an image displaying device.

Such a liquid crystal display device may be provided with a liquid crystal display panel comprising a color filter substrate for displaying an image in colors, a thin film transistor array substrate attached to the color filter substrate, and a liquid crystal layer filling in a cell gap formed between the array substrate and the color filter substrate.

The thin film transistor functions as a switching device for applying or cutting off an electric field to/from the liquid crystal is arranged in a matrix form at the thin film transistor array substrate.

Additionally, in the color filter substrate, sub-color filter layers of red, green and blue for displaying information in colors are formed at every unit pixel.

The thin film transistor array substrate and the color filter substrate are manufactured using different production lines. Then they are formed as one unit cell through attaching and cutting processes.

In addition, a liquid crystal is injected into the liquid crystal display panel manufactured through the above steps to form one unit liquid crystal display panel.

When the liquid crystal display panel is formed through these processes, an auto verification process is performed to examine the driving state of the completed liquid crystal display panel and determine whether it is inferior.

The auto verification process is used to determine whether the liquid crystal display panel is inferior by displaying a predetermined image on the completed liquid crystal display panel. The auto verification process examines whether the driving of colors is good, whether a voltage is properly applied to each unit pixel, whether there is a line defect or a point defect on a screen displaying unit, whether there is a stain on a screen, or the like. On the basis of the inspected results from the auto verification process, an operator determines a grade or rating of the liquid crystal display panel and inputs it to equipment such as a computer.

If the grade of the liquid crystal display panel corresponds to a predetermined standard, the operator inputs the grade of the liquid crystal display panel to a computer, or the like. The liquid crystal display panel is transferred to a predetermined storing place by a robot controlled by a host.

A plurality of cartridges may be classified into several grades and arranged at the storing place of the liquid crystal display panels. A robot arm stores the liquid crystal display panel which have been graded to the cartridge based on its determined grade.

However, determination of the grade varies according to a client's request. Namely, what one client regards as inferior may be accepted by another client. In addition, according to uses of the image displaying device using the liquid crystal display panel, an acceptable range of inferiority may be different. Accordingly, the grade is not fixed but changeable on demand.

Moreover, since the cartridge in which the liquid crystal display panel whose grade has been determined is stored has no means to check the grade, a product having a different grade may be shipped.

And, to check the grade, each cartridge may be marked manually. However, when a standard for grade and the cartridge in which the liquid crystal display panel having a predetermined grade is stored are changed, the corresponding cartridge should be manually re-marked.

SUMMARY OF THE INVENTION

Accordingly, the present invention is directed to an automatic apparatus for displaying the grade of a liquid crystal display device and an operating method thereof that substantially obviate one or more of the problems due to limitations and disadvantages of the related art.

An advantage of the present invention is to provide a means to easily check a cartridge in which a liquid crystal display panel whose grade has been determined is stored from the outside if the liquid crystal display panel is completed and then graded by a final examination.

Another advantage of the present invention is to facilitate checking the grade from the outside by automatically displaying the grade of the cartridge in which the graded liquid crystal display panel is stored even though the grade of the liquid crystal display panel is changed, not by manually marking it.

To achieve these and other advantages and in accordance with the purpose of the present invention, as embodied and broadly described an apparatus for automatically displaying a grade of a liquid crystal display device, includes: a grade determining unit for determining the grade of the liquid crystal display panel; a grade inputting unit for inputting the grade of the liquid crystal display panel whose grade has been determined in the grade determining unit; a grade discriminating unit for transferring the grade of a corresponding liquid crystal display panel based upon receiving data input to the grade inputting unit; a storing unit having a grade displaying unit for classifying the graded liquid crystal display panels according to grades and storing the grades; and a robot driving unit for transferring the liquid crystal display panel to the storing unit according to instructions from the grade discriminating unit.

In another aspect of the present invention, a method of operating an apparatus for automatically displaying the grade of a liquid crystal display device includes: displaying a grade indicator on displaying units installed in a plurality of storing devices of a storing unit in which liquid crystal display devices is to be stored; determining the grade of the liquid crystal display device using a grade determining unit; inputting the determined grade of the liquid crystal display device to a grade inputting unit; comparing the input grade of the liquid crystal display device from the grade inputting unit with a value of an inspected liquid crystal device panel and transmitting the comparison information to a robotic portion; and storing the graded liquid crystal display device in the storing device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
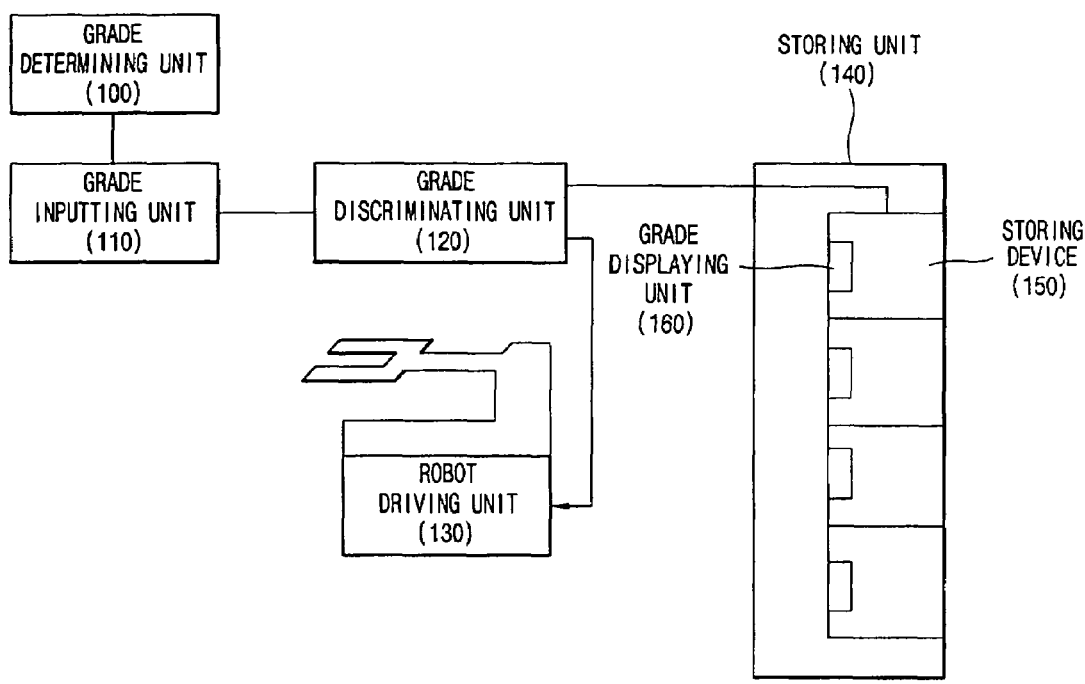
FIG. 1 is a schematic construction of an automatic apparatus for displaying a grade in accordance with the present invention.

In FIG. 1, when a completed liquid crystal display panel arrives at a grade determining unit 100, a predetermined auto verification process is carried out in the grade determining unit 100. In the auto verification process, it is examined whether the liquid crystal display panel meets a particular standard by displaying a predetermined pattern on the liquid crystal display panel. During the auto verification process, for example, the color quality of the liquid crystal display panel is determined. The determination of whether a voltage is applied to a unit pixel, whether wires are down, and whether there is a stain, or the like in the display may also be made. Based upon an extensive assessment of these types of inspection items collectively, an operator carrying out the auto verification process of the liquid crystal display panel may determine a grade or quality rating and input the grade to a grade inputting unit 110 using a computer, or the like.

The grade information input to the grade inputting unit 110 is transmitted to a grade discriminating unit 120. The determined grade of the liquid crystal display panel is given to a corresponding liquid crystal display panel in the grade discriminating unit 120. That is, by comparing the information input to the grade inputting unit 110 with the inspected liquid crystal display panel, the inspected liquid crystal display panel is given its grade. Thereafter, the grade discriminating unit 120 transmits the grade information to a robot driving unit 130. A robot installed at the robot driving unit 130 transfers the corresponding liquid crystal display panel to a storing unit 140.

The storing unit 140 includes a plurality of storing devices 150 such as cartridges for storing the liquid crystal display panels. A front end of each storing device is provided with a grade displaying unit 160, for example, of a light emitting display made up of an LED (Light Emitting Diode), or the like, for displaying the grade of the liquid crystal display panel stored in the storing device 150.

The grade displayed on the grade displaying unit 160 has been previously decided by the operator before inspecting the liquid crystal display panel. If the operator decides and inputs the storing device to be used for each grade, the grade is displayed on the grade displaying unit 160 installed at the front end of each storing device.

In addition, if a standard for a grade of the liquid crystal display panel is changed, the operator determines the storing device in which the liquid crystal display panel having the corresponding grade is to be stored and changes the grade displayed through the grade displaying unit. In such a situation, another process must be performed.

Figure 2:
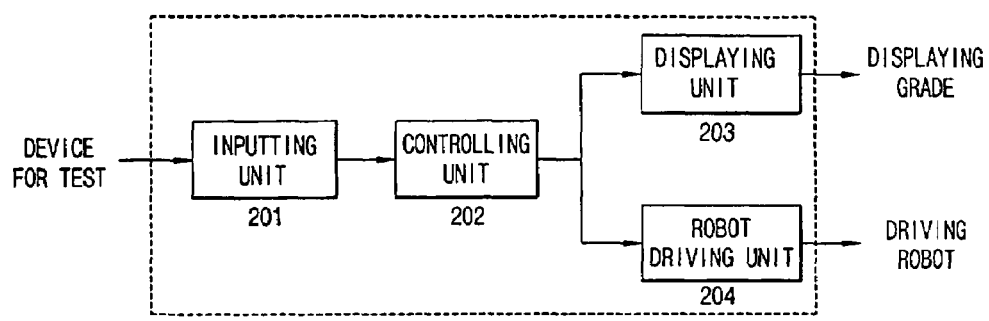
FIG. 2 is a block diagram showing operation of the apparatus for displaying a grade in accordance with the present invention.

A process of performing the above operation will be described with reference to the block diagram of FIG. 2. For the operation of the present invention, two items are input to the inputting unit 201. First, a grade to be displayed on a grade displaying unit 160 installed at a front end of the storing device 150 of the storing unit 140 is input. Second, a grade of the inspected liquid crystal display panels to be stored in the storing devices 150 classified by grades is input.

First, the operator gives a name to a plurality of the storing devices 150 according to grades, transmits the name information to a controlling unit 202 through the inputting unit 201, and displays the grade on the grade displaying unit 160 of the storing device 150 through a displaying unit 203.

Next, when a grade of a liquid crystal display panel is determined by inspection, the determined grade information is input to the inputting unit 201. The inputting unit 201 transmits the grade information of the inspected liquid crystal display panel to the controlling unit 202, and the grade information of the inspected liquid crystal display panel is transmitted to the controlling unit 202. The information of the liquid crystal display panel given its grade information by the controlling unit 202 is then transmitted to the robot driving unit 204, and the liquid crystal display panels having been inspected are transferred and stored in the storing devices 150 classified by grades.

Figure 3:
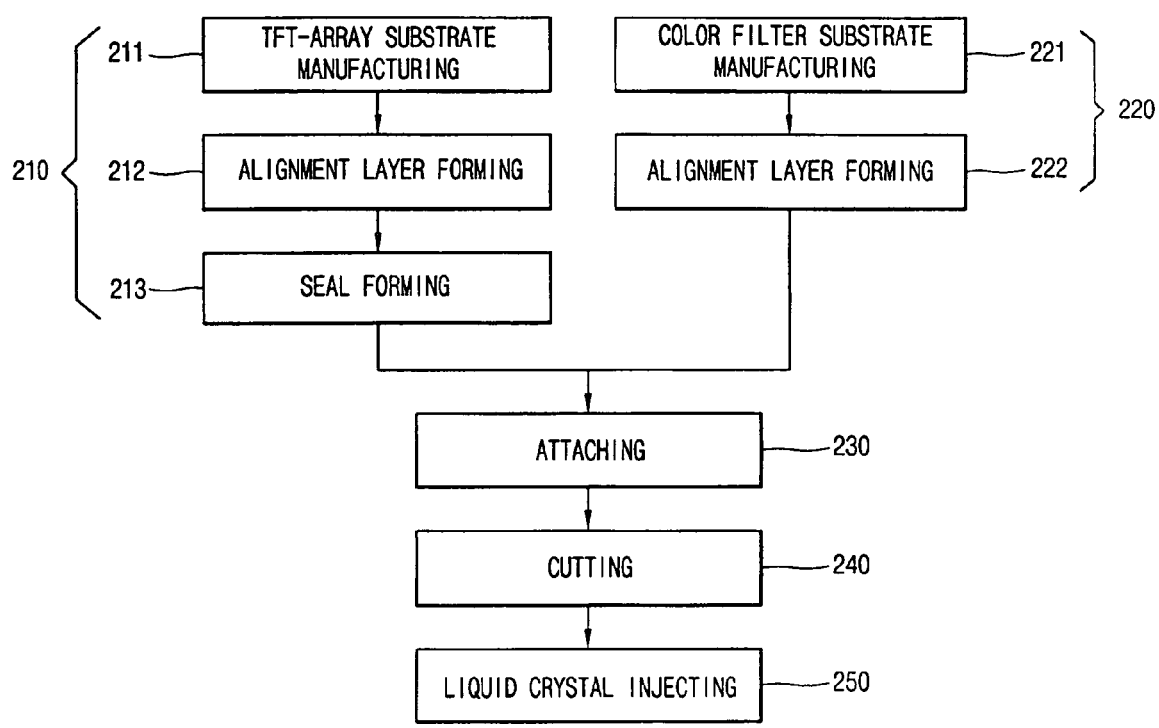
FIG. 3 is a flow chart showing a fabrication process of a liquid crystal display panel in accordance with the present invention.

Such processes are performed before shipping the liquid crystal display panel after completing the liquid crystal display panel. Hereinafter, a process of manufacturing the liquid crystal display panel will be described with reference to FIG. 3.

As shown therein, a method of manufacturing the liquid crystal display device of the present invention includes: a step 210 of forming a TFT array substrate as a lower substrate; a step 220 of forming a color filter substrate as an upper substrate; a step 230 of attaching the upper substrate to the lower substrate; a step 240 of cutting off the attached substrate according to a unit cell; and a step 250 of injecting a liquid crystal into the cut unit cell.

First, the step 210 of forming the TFT array substrate includes: arranging a transparent mother substrate at which a plurality of unit cells may be formed; forming a plurality of gate lines parallel to each other on the substrate; forming a gate insulating layer on the substrate at which the gate lines have been formed; forming a semiconductor layer on the gate insulating layer; forming a data line, a source electrode and a drain electrode on the semiconductor layer; a passivation layer on the substrate at which the data line, the source electrode and the drain electrode have been formed; and forming a pixel electrode on the passivation layer.

Further, a process 212 of forming an alignment layer for an alignment of the liquid crystal on the TFT array substrate formed by the above process is completed.

The alignment layer forming process may be largely divided into an applying process, a rubbing process and a cleaning process. The alignment layer may be applied for example, by a spin-coating method or a printing method. After the alignment layer is formed, an alignment process of rubbing the alignment layer with a rubbing cloth, or the like is performed.

Next, a seal forming process 213 includes forming a sealing line along an outer edge of a pixel region of the TFT array substrate at which the alignment layer has been formed. The sealing line is formed to maintain a cell gap when attaching the upper substrate and the lower substrate and prevent a leakage of the liquid crystal injected into the space between the attached upper substrate and lower substrate.

A sealant may be formed, for example, by a screen printing method of printing the sealant using a mask having a seal pattern or a dispensing method of drawing the sealant at a predetermined position using a dispenser.

The screen printing method comprises a process of printing the sealant on the substrate through the mask and a process of drying a solvent included in the sealant.

In the dispensing method, the sealant may be extruded to a desired position by the dispenser including the sealant, so that it is suitable for forming a large substrate and the sealant may be saved.

After the seal line is formed along an outer edge of the pixel region of the TFT array substrate, a process 230 of attaching the color filter substrate formed through a separate process 220 to the TFT array substrate is performed.

The color filter substrate is formed through a process separate from the process of forming the TFT array substrate as the lower substrate.

The process 220 of forming the color filter substrate includes: a process 221 of forming the color filter substrate including a black matrix, a color filter and a common electrode on the substrate; a process 222 of forming the alignment layer on the color filter substrate; and a rubbing process of determining a certain alignment direction by rubbing the alignment layer using the rubbing cloth, or the like. Through such processes, the color filter substrate is completed.

As described so far, the color filter substrate formed through the separate process and the thin film transistor array substrate are to be in an attaching process.

To attach the thin film transistor array and color filter substrate first, an assembling process of attaching the upper substrate and the lower substrate to each other is performed. The assembling process is a process that devices formed at the lower substrate and the color filter layer formed on the upper substrate are precisely arranged. The process is very important and requires precision because light may be leaked with a fine error. The alignment should be made with an aligning error within several μm.

The position of the substrate is read by an alignment mark formed at an edge of the upper substrate or the lower substrate, and the upper substrate and the lower substrate are aligned within several μm.

When a substrate obtained by coupling the upper substrate and lower substrate at their edges by the sealant is transferred in a substrate attaching device by an auto guided vehicle, the upper substrate and the lower substrate are attached by applying a certain pressure and heat on the substrate.

The cutting process 240 of separating the substrates having passing through the attaching process into unit liquid crystal cells is proceeded. In the cutting process, a crack is generated on the substrate by a scribing wheel, or the like, and then the substrate is cut into unit cells using a breaking process.

Because an edge of the liquid crystal display panel that has passed through the cutting process is rough, the edge is ground using a grinding process.

Next, a liquid crystal injecting process of injecting the liquid crystal into a cell gap formed by the upper substrate and the lower substrate is performed. After injecting the liquid crystal, a liquid crystal injection opening is sealed and one unit liquid crystal display panel is completed.

In case of forming a liquid crystal layer using a dispensing method in addition to the liquid crystal injecting method, the liquid crystal is dispensed on the thin film transistor array substrate, a seal forming process is performed on the color filter substrate, and then by passing through the attaching process and the cutting process, the unit liquid display panel is completed. In forming the seal, the sealant may be formed as a closed shape without having a liquid crystal injecting hole. Also, the seal and the formation of the liquid crystal layer may be proceeded on the same substrate.

Next, it is determined whether the completed liquid crystal display panel is inferior or not using a certain inspection. The completed liquid crystal display panel reaches an auto verification process.

Before carrying out the auto verification process, the operator displays a grade in advance on the storing device 150 of the storing unit 140 in which the corresponding liquid crystal display panel is to be stored.

After displaying the grade on the storing device 150, by determining a grade of the liquid crystal display device, inputting the grade, discriminating the input grade and the liquid crystal display panel, and storing the liquid crystal display device of which grade has been determined to the storing device having the corresponding grade in the storing unit, the liquid crystal display panels are classified by grades and stored to the storing devices.

In the step of determining the liquid crystal display device, a predetermined pattern is displayed on the liquid crystal display panel, a color implementation state, a state of applying a voltage to a unit pixel, a line or a point defect of the liquid crystal display panel, stain inferiority on the liquid crystal display panel, and the like are examined. Evaluating examined items collectively, the operator determines a grade of the corresponding liquid crystal display panel and inputs the grade to the grade inputting unit 110. An electronic calculating apparatus such as a personal computer may be used as the grade inputting unit 110. The grade inputting unit 110 is connected to a central computer including the grade discriminating unit 120, exchanging information.

When the grade is determined in the grade inputting unit 110, the grade inputting unit 110 transmits the grade information of the liquid crystal display panel to the grade discriminating unit 120.

The grade discriminating unit 120 correlates the grade information transmitted from the grade inputting unit 110 with the corresponding liquid crystal display panel, so that it gives the grade to the corresponding liquid crystal display panel having passing through the auto verification process.

Information of the liquid crystal display panel which is to pass through the auto verification process is stored in the grade discriminating unit 120. If the grade information is added, the grade information is given to the corresponding liquid crystal display panel and the grade information is transmitted to the robot driving unit 130.

Therefore, while the robot driving unit 130 loads the liquid crystal display panel of which the auto verification process has been completed, it transfers the loaded liquid crystal display panel to the storing unit 140 by receiving the grade information from the grade discriminating unit 120 of the central computer.

The storing unit 140 includes a plurality of storing devices 150, and the grade is displayed on each storing by the grade displaying unit 160.

A robot of the robot driving unit 130 transfers the graded liquid crystal display panels to the corresponding storing devices 150, unloads the display panels, classifies the liquid crystal display panels by grades, and then stores the display panels.

Using the above-described method, it is easy to check a stored liquid crystal display panel according to the grade from the outside, and there is nothing to worry about wrongly delivering the graded liquid crystal display panel of which grade has been determined.

By providing an image displaying apparatus for displaying a grade on a front end of each storing device in which the liquid crystal display panels classified by grades according to such a method are stored, it is easy to check the stored liquid crystal display panel from the outside, so that a problem that errors in the grade are made may be improved. In addition, another problem that the grade should be displayed again on the storing device whenever a standard for grade is changed may be solved. Also, by automatically displaying the grade, errors in displaying the grade may be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for automatically displaying a grade of a liquid crystal display panel comprising:

displaying a predeterminded pattern on the liquid crystal display panel;

a grade determining unit for determining the grade of the liquid crystal panel based on said displayed pattern and for displaying a predetermined pattern on the liquid crystal display panel;

a grade inputting unit for inputting the grade of the liquid crystal display panel whose grade has been determined in the grade determining unit;

a grade discriminating unit for comparing the input grade of the liquid crystal display device from the grade inputting unit with a value of an inspected liquid crystal display panel and for transferring the grade of a corresponding liquid crystal display panel based upon receiving data input to the grade inputting unit;

a storing unit having a grade displaying unit for classifying the graded liquid crystal display panels according to grades and storing the grades; and a robot driving unit for transferring the liquid crystal display panel to the storing unit according to instructions from the grade discriminating unit.

2. The apparatus of claim 1, wherein the storing unit includes a plurality of storing devices for classifying the liquid crystal display panels based upon grades.

3. The apparatus of claim 2, wherein the storing devices include a grade displaying unit.

4. The apparatus of claim 1, wherein the grade displaying unit is an LED display device.

5. The apparatus of claim 1, wherein grade information to be displayed on the grade displaying unit is input in the grade inputting unit.

6. A method of operating an apparatus for automatically displaying the grade of a liquid crystal display device comprising:

displaying a grade indicator on grade displaying units installed in a plurality of storing devices of a storing unit where liquid crystal display devices are to be stored;

displaying a predetermined pattern on the liquid crystal display device;

determining the grade of the liquid crystal display device based on said displayed pattern using a grade determining unit;

inputting the determined grade of the liquid crystal display device to a grade inputting unit;

comparing the input grade of the liquid crystal display device from the grade inputting unit with a value of an inspected liquid crystal display panel and transmitting the comparison information to a robotic portion; and storing the graded liquid crystal display device in the storing device.

7. The apparatus of claim 6, wherein storing the liquid crystal display device of which grade has been determined includes:

transmitting the grade information to a robot driving unit to transfer the liquid crystal display panel which has been inspected from the grade discriminating unit; and transferring and storing the liquid crystal display device in the storing device using the robot driving unit.

\* \* \* \* \*